United States Patent
Yin

(10) Patent No.: US 9,582,083 B2
(45) Date of Patent: Feb. 28, 2017

(54) DIRECTIONAL LIGHT SENSORS

(71) Applicant: Apple Inc., Cupertino, CA (US)

(72) Inventor: Ye Yin, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 686 days.

(21) Appl. No.: 13/628,388

(22) Filed: Sep. 27, 2012

(65) Prior Publication Data

US 2014/0085265 A1    Mar. 27, 2014

Related U.S. Application Data

(60) Provisional application No. 61/579,448, filed on Dec. 22, 2011.

(51) Int. Cl.
G06F 3/041   (2006.01)
G06F 3/03    (2006.01)
(Continued)

(52) U.S. Cl.
CPC .............. *G06F 3/0304* (2013.01); *G01J 1/06* (2013.01); *G01J 1/4204* (2013.01);
(Continued)

(58) Field of Classification Search
CPC .......... G01J 1/44; G01J 1/4204; G01J 1/4228; G01J 1/06; G06F 1/1637; G06F 3/0304;
(Continued)

(56) References Cited

U.S. PATENT DOCUMENTS 6,339,429 B1   1/2002   Schug
6,459,436 B1   10/2002  Kumada
(Continued)

FOREIGN PATENT DOCUMENTS

EP   1335430    8/2003
WO   00/41378   7/2000
(Continued)

OTHER PUBLICATIONS

Roland Juhala and George Dube, "Refractive Beam Steering", Sep. 30, 2004, Space Systems Engineering and Optical Alignment Mechanisms.*
(Continued)

*Primary Examiner* — Adam R Giesy
(74) *Attorney, Agent, or Firm* — Treyz Law Group, P.C.; Zachary D. Hadd

(57) ABSTRACT

A directional light sensor may be provided having an array of beam steering elements and an array of corresponding light sensors. Each beam steering element may be configured to direct light from a given angle onto a particular light sensor so that the angular distribution of light may be mapped onto a planar grid of light sensors. Each beam steering element may be formed using holographic, refractive, diffusive or other structures for redirecting a beam of light. An electronic device may be provided having a directional light sensor. The directional light sensor in the electronic device may provide ambient light data or user input data to the electronic device. A test system may be provided having a directional light sensor for gathering ambient light data during testing and manufacturing of an electronic device.

25 Claims, 17 Drawing Sheets

(51) Int. Cl.
   *G06F 1/16* (2006.01)
   *G01J 1/06* (2006.01)
   *G01J 1/42* (2006.01)

(52) U.S. Cl.
   CPC .......... *G01J 1/4228* (2013.01); *G06F 1/1637* (2013.01); *G06F 1/1684* (2013.01); *G09G 2320/0693* (2013.01); *G09G 2360/144* (2013.01); *G09G 2360/145* (2013.01); *G09G 2360/147* (2013.01)

(58) Field of Classification Search
   CPC ......... G06F 3/042; G06F 1/1684; G09G 3/00; G06F 3/042; G09G 2320/0693; G09G 2360/147; G09G 2360/144; G09G 2360/145
   See application file for complete search history.

(56) References Cited

U.S. PATENT DOCUMENTS

| | | | |
|---|---|---|---|
| 7,460,196 B2 | 12/2008 | Kim | |
| 7,760,975 B2 | 7/2010 | Lowles | |
| 7,825,891 B2 | 11/2010 | Yao et al. | |
| 7,960,682 B2 | 6/2011 | Gardner, Jr. | |
| 8,096,695 B2 | 1/2012 | Ong | |
| 8,194,031 B2 | 6/2012 | Yao et al. | |
| 8,264,678 B2 | 9/2012 | Souchkov et al. | |
| 8,384,003 B2 | 2/2013 | Gardner, Jr. | |
| 2001/0023194 A1* | 9/2001 | Pettersson et al. | 455/566 |
| 2002/0088930 A1* | 7/2002 | Graham et al. | 250/227.11 |
| 2003/0036215 A1* | 2/2003 | Reid | 438/52 |
| 2003/0151821 A1* | 8/2003 | Favalora et al. | 359/619 |
| 2003/0189211 A1 | 10/2003 | Deitz | |
| 2003/0189586 A1 | 10/2003 | Vronay | |
| 2004/0036820 A1 | 2/2004 | Runolinna | |
| 2004/0095402 A1 | 5/2004 | Nakano | |
| 2005/0030271 A1* | 2/2005 | Liu | 345/89 |
| 2005/0219197 A1 | 10/2005 | Pasqualini et al. | |
| 2007/0236485 A1 | 10/2007 | Trepte | |
| 2008/0284716 A1 | 11/2008 | Edwards | |
| 2009/0103780 A1* | 4/2009 | Nishihara et al. | 382/103 |
| 2010/0026192 A1* | 2/2010 | Hadwen et al. | 315/149 |
| 2010/0079426 A1 | 4/2010 | Pance et al. | |
| 2010/0213259 A1* | 8/2010 | Gao | 235/469 |
| 2010/0308964 A1* | 12/2010 | Ackley et al. | 340/10.1 |
| 2011/0032214 A1* | 2/2011 | Gruhlke et al. | 345/175 |
| 2011/0074782 A1* | 3/2011 | Hirotani et al. | 345/426 |
| 2011/0122091 A1* | 5/2011 | King et al. | 345/175 |
| 2011/0248961 A1* | 10/2011 | Svajda et al. | 345/175 |
| 2012/0099856 A1* | 4/2012 | Britz et al. | 398/26 |
| 2012/0133790 A1* | 5/2012 | Sams | 348/222.1 |
| 2012/0137253 A1* | 5/2012 | Eom et al. | 715/835 |
| 2012/0218239 A1 | 8/2012 | Yao et al. | |
| 2012/0236037 A1* | 9/2012 | Lessing et al. | 345/661 |
| 2012/0236216 A1* | 9/2012 | Sharma et al. | 349/1 |
| 2012/0292482 A1* | 11/2012 | Cook et al. | 250/206.1 |
| 2012/0307328 A1* | 12/2012 | Kessler | 359/202.1 |
| 2012/0320385 A1* | 12/2012 | Mu et al. | 356/624 |
| 2013/0002722 A1* | 1/2013 | Krimon et al. | 345/661 |
| 2013/0033626 A1* | 2/2013 | Ng et al. | 348/262 |
| 2013/0050526 A1* | 2/2013 | Keelan | 348/231.99 |
| 2013/0169606 A1* | 7/2013 | Yin | G01J 1/0242 345/207 |
| 2014/0015942 A1* | 1/2014 | Said | 348/59 |
| 2014/0070081 A1* | 3/2014 | Spraggs et al. | 250/221 |
| 2014/0139668 A1* | 5/2014 | Short | 348/143 |

FOREIGN PATENT DOCUMENTS

| | | |
|---|---|---|
| WO | 02/37454 | 5/2002 |
| WO | 2007/069107 | 6/2007 |
| WO | 2010062481 | 6/2010 |
| WO | 2012071674 | 6/2012 |

OTHER PUBLICATIONS

"Refractive Beam Steering" by Roland E. Juhala and George Dubé Publication Date: Sep. 30, 2004.*
Hotelling et al., U.S. Appl. No. 13/283,446, filed Oct. 27, 2011.
Shedletsky et al., U.S. Appl. No. 13/732,966, filed Jan. 2, 2013.
Jong et al., U.S. Appl. No. 13/686,746, filed Nov. 27, 2012.
Land et al., U.S. Appl. No. 13/746,549, filed Jan. 22, 2012.
Gardner Jr., U.S. Appl. No. 13/771,779, filed Feb. 20, 2012.
Zheng., U.S. Appl. No. 13/738,908, filed Jan. 10, 2013.
Zheng, U.S. Appl. No. 13/678,349, filed Nov. 15, 2012.
Zheng et al., U.S. Appl. No. 13/241,034, filed Sep. 22, 2011.

* cited by examiner

DIRECTIONAL LIGHT SENSORS

This application claims the benefit of provisional patent application No. 61/579,448, filed Dec. 22, 2011, which is hereby incorporated by reference herein in its entirety.

BACKGROUND

This invention relates generally to a novel light sensor configuration and, more particularly, to a directional light sensor having position dependent light sensing capabilities and applications derived therefrom.

Ambient light sensors are often used for sensing the intensity of ambient light in the environment surrounding the ambient light sensor. For example, electronic devices such as portable computers are sometimes provided with an ambient light sensor. The portable computer is often configured to adjust the intensity of a display based on ambient light intensity information from the ambient light sensor.

Conventional ambient light sensors are capable of sensing the total intensity of all ambient light incident on the ambient light sensor. However, in some situations it may be desirable to be able to map the intensity of the ambient light to the direction from which the ambient light is emitted.

It would therefore be desirable to provided improved ambient light sensors.

SUMMARY

Electronic devices may be provided with a directional light sensor (DLS, sometimes called an ambient light sensor, or directional ambient light sensor). A directional light sensor may include an array of beam steering elements and an array of light sensing elements.

If desired, the array of beam steering elements in a directional light sensor may include one beam steering element for each light sensor.

Each beam steering element may be formed using holographic, refractive, diffusive or other structures for redirecting a beam of light. Each beam steering element may be configured to redirect a beam of light from a given viewing angle onto a given light sensor so that the light received from each light sensor corresponds to light received from a given viewing angle. The overall working principle is to implement the beam steering elements so that the distribution of the ambient light is changed from an angular space described by particular angles [θ,Φ] to a Euclidean space with described by particular positions [x,y] (e.g., corresponding to an x-y distribution of light sensor pixels). The mapping from [θ,Φ] to [x,y] may be exclusive and complete.

Electronic devices such as computers, laptop computers, cellular telephones or other electronic device may be provided with a directional light sensor and a display such as a liquid crystal display (LCD) or organic light emitting diode (OLED) display.

A liquid crystal display may include illuminating structures and reflective structures. Illuminating structures may include light emitting structures such as backlight structures. The backlight structures may produce backlight that passes through layers in the display. The reflective structures may reflect ambient light that has been generated externally to the display and subsequently passed through layers in the display.

The display may be a transmissive display such as a liquid crystal display or an organic light emitting diode (OLED) display. During operation of an electronic device, the intensity of light generated by an LCD or OLED display may be adjusted based on ambient light conditions sensed by the directional light sensor.

If desired, the display may be a transflective display having both transmissive and reflective elements. A transflective display may include circuitry that actively adjusts the intensity of light produced by the transmissive structures based on the ambient light conditions sensed by the directional ambient light sensor. As an example, in bright sunlight, a backlight may be turned off because sufficient light for illuminating the display can be reflected by the reflecting structures. As another example, the intensity of light produced by the backlight structures may be increased to ensure that a display is visible in low light conditions (e.g., in a dark room).

Directional ambient light sensors may be configured to generate directional light data such as directional ambient light data for an electronic device. Directional ambient light data may be used by circuitry in a device to determine settings for the intensity of some portions of a display, all of a display, or may be combined with orientation data from a gyroscope or other orientation sensor to optimally generate colors and intensities for viewing on a display.

If desired, an electronic device may be configured to accept user input based on changes in ambient light conditions sensed by a directional light sensor. For example, a user may wave a hand, a finger, or another object over a directional light sensor in an electronic device. The directional light sensor may be configured to sense the motion of the object by sensing directional changes in the ambient light and to generate a response to the motion (e.g., a device may be configured to turn the page of a virtual book displayed on a device display in response to a right-to-left wave of a hand over the directional light sensor). In this way, a directional light sensor may be configured to operate as a touch-free input component for an electronic device.

Circuitry associated with the directional light sensor may be configured to filter directional light data in order to optimize detection of user inputs. For example, the circuitry may be configured to ignore changes in ambient light that occur on a time scale much faster or much slower than a typical human hand motion.

Electronic device displays may be viewed from multiple angles during normal operation of a device. Displays may also be exposed to various ambient light conditions during normal operations of the device. For example, ambient light may non-uniformly illuminate a device display. As another example, the distribution of colors in ambient light that is incident on a display may change when a user moves a device from sunlight to incandescent or fluorescent lighting conditions. Displays may be provided with optimizing features such as anti-reflective (AR) coatings on display cover layers or adaptive display functions for optimizing the performance of the displays in various ambient light conditions.

In order to provide device displays with efficient and effective optimizing features and to ensure proper operation of a device display, tests may be performed using during manufacturing of the device. Test systems may be provided for performing tests of device displays using test equipment to verify proper response to various ambient light conditions, to verify proper operation of optimization features such as AR coatings, to verify proper illumination of the display for viewing at various viewing angles, etc.

Test systems may be provided with directional light sensors for gathering test data. If desired, the array of beam steering elements in a directional light sensor in a test system may include one beam steering element for each pixel in a device display.

Test data gathered using a directional light sensor may include ambient light information corresponding to ambient light intensity and/or color for ambient light generated at multiple viewing angles. Test systems may be used, for example, for gathering ambient light data that includes information on ambient light intensity and ambient light color from multiple viewing angles.

A test system may include computing equipment for processing test data. A test system may include additional light sensors for sensing light emitted from or reflected by a device display. If desired, test systems may be used, for example, to measure light intensity and light color emitted from a display at multiple viewing angles.

Further features of the invention, its nature and various advantages will be more apparent from the accompanying drawings and the following detailed description of the preferred embodiments.

DETAILED DESCRIPTION

Electronic devices such as computers, handheld devices, computer monitors, televisions, cellular telephones, media players, and other equipment may have displays and other components such as directional light sensors. Displays may include emissive, reflective or a combination of emissive and reflective technologies.

A directional light sensor (DLS) may be configured to sense an angular distribution of ambient light that is incident on the directional light sensor and to store directional light data corresponding to the ambient light.

An electronic device may include processing circuitry. The processing circuitry may be configured to generate a response to an ambient light distribution detected by the directional light sensor. As examples, the processing circuitry may be configured to change the intensity of display light based on the ambient light distribution or to alter the content displayed on a device display based on changes in the ambient light distribution (e.g., due to a gesture from a user).

Figure 1:
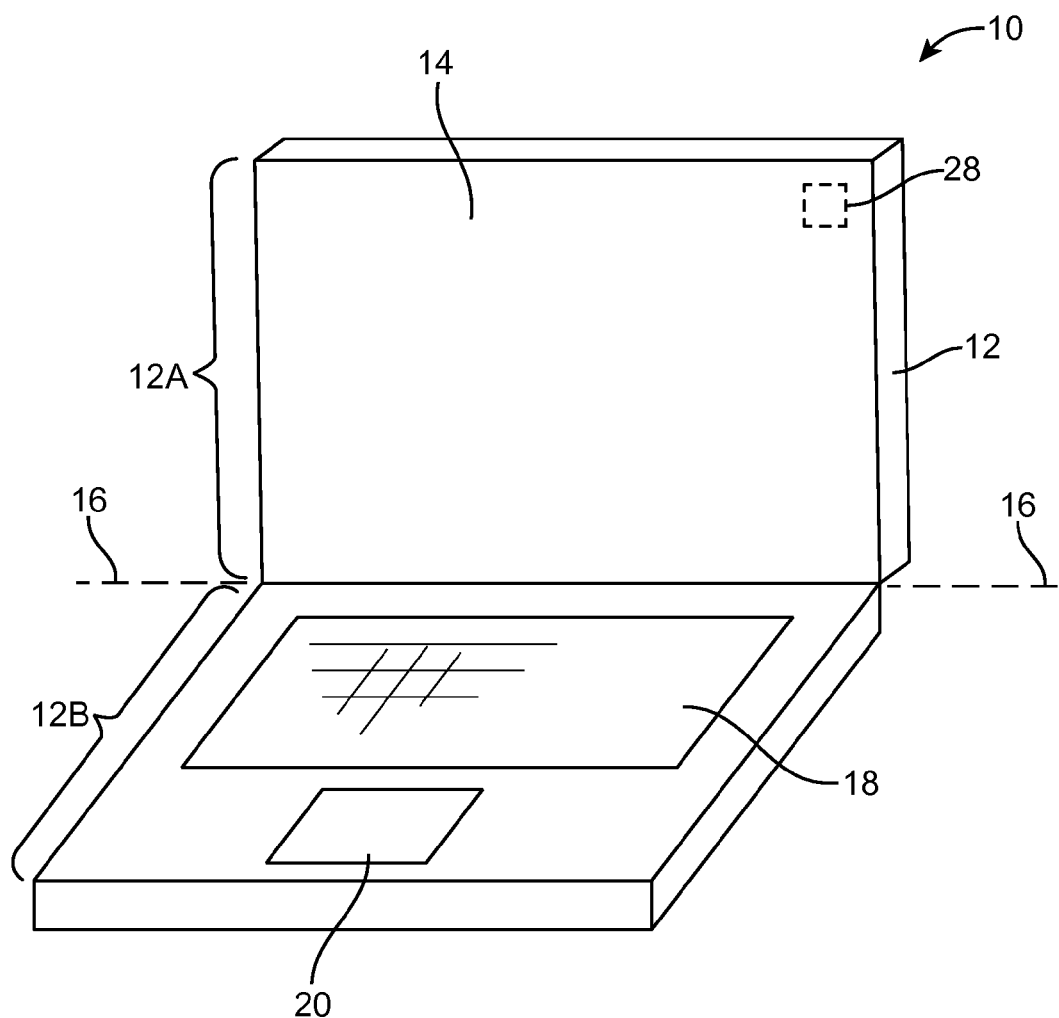
FIG. 1 is a diagram of an illustrative electronic device with a display such as a portable computer in accordance with an embodiment of the present invention.

An illustrative electronic device of the type that may be provided with a directional light sensor is shown in FIG. 1. Electronic device 10 may be a computer such as a computer that is integrated into a display such as a computer monitor, a laptop computer, a tablet computer, a somewhat smaller portable device such as a wrist-watch device, pendant device, or other wearable or miniature device, a cellular telephone, a media player, a tablet computer, a gaming device, a navigation device, a computer monitor, a television, or other electronic equipment.

As shown in FIG. 1, device 10 may include a display such as display 14. Display 14 may be a touch screen that incorporates capacitive touch electrodes or other touch sensor components or may be a display that is not touch sensitive. Display 14 may include display structures with image pixels formed from light-emitting diodes (LEDs), organic LEDs (OLEDs), plasma cells, electrowetting pixels, electrophoretic pixels, liquid crystal display (LCD) components, or other suitable image pixel structures. Touch sensor electrodes may be included in display 14 to provide display 16 with touch sensing capabilities (e.g., display 16 may be a touch screen) or display 14 may be touch insensitive.

Device 10 may include a light sensor such as DLS 28. DLS 28 may include an array of beam steering elements configured to direct light from various directions onto an associated array of light sensors (e.g., sensor pixels). Directional light sensor 28 may be configured to gather directional light data that includes information on the intensity and color of ambient light as a function of angular position. Device 10 may include circuitry such as processing circuitry configured to generate a response to directional light data gathered by the directional light sensor.

Device 10 may have a housing such as housing 12. Housing 12, which may sometimes be referred to as a case, may be formed of plastic, glass, ceramics, fiber composites, metal (e.g., stainless steel, aluminum, etc.), other suitable materials, or a combination of any two or more of these materials.

Housing 12 may be formed using a unibody configuration in which some or all of housing 12 is machined or molded as a single structure or may be formed using multiple structures (e.g., an internal frame structure, one or more structures that form exterior housing surfaces, etc.).

As shown in FIG. 1, housing 12 may have multiple parts. For example, housing 12 may have upper portion 12A and lower portion 12B. Upper portion 12A may be coupled to lower portion 12B using a hinge that allows portion 12A to rotate about rotational axis 16 relative to portion 12B. A keyboard such as keyboard 18 and a touch pad such as touch pad 20 may be mounted in housing portion 12B.

Directional light sensor 28 may be positioned behind a portion of a transparent layer of display 14, may be positioned under an opening in display 14, may be positioned under an opening in housing 12 or may be otherwise positioned in device 10.

Figure 2:
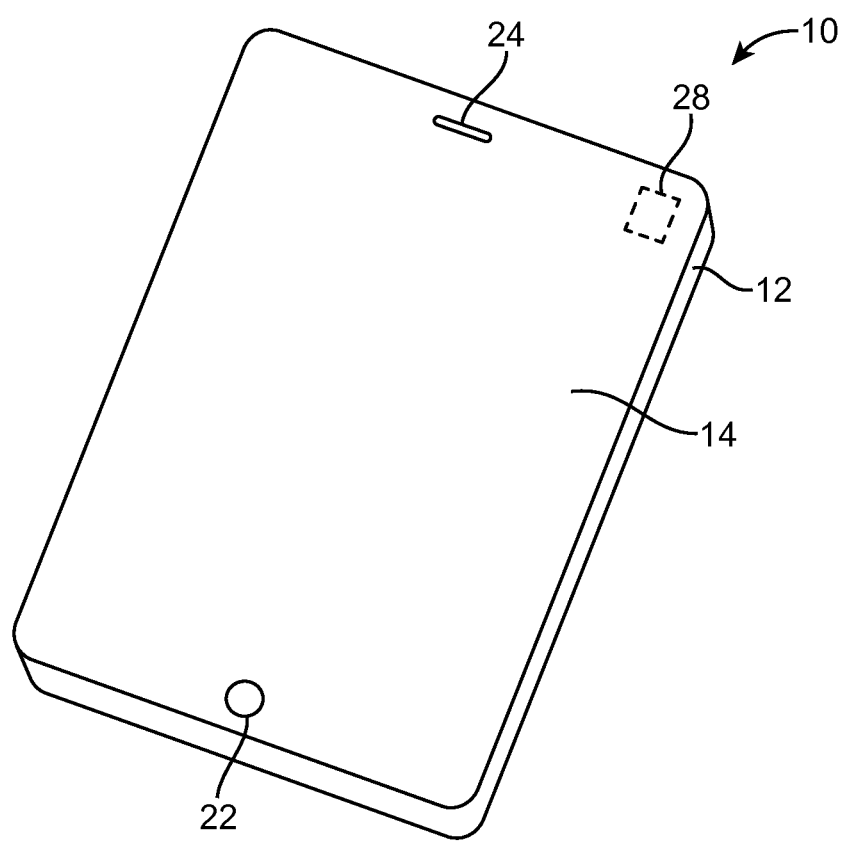
FIG. 2 is a diagram of an illustrative electronic device with a display such as a cellular telephone or other handheld device in accordance with an embodiment of the present invention.

In the example of FIG. 2, device 10 has been implemented using a housing that is sufficiently small to fit within a user's hand (i.e., device 10 of FIG. 2 may be a handheld electronic device such as a cellular telephone). As show in FIG. 2, device 10 may include a display such as display 14 mounted on the front of housing 12 and a light sensor such as directional light sensor 28.

Display 14 may be substantially filled with active display pixels or may have an inactive portion and an inactive portion. Display 14 may have openings (e.g., openings in the inactive or active portions of display 14) such as an opening to accommodate button 22 and an opening to accommodate speaker port 24.

Figure 3:
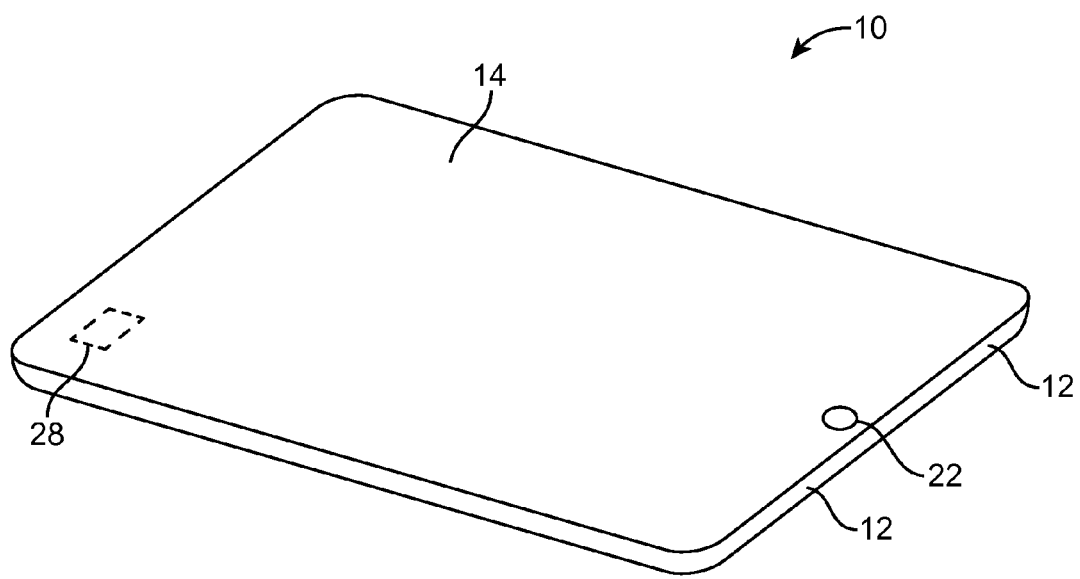
FIG. 3 is a diagram of an illustrative electronic device with a display such as a tablet computer in accordance with an embodiment of the present invention.

FIG. 3 is a perspective view of electronic device 10 in a configuration in which electronic device 10 has been implemented in the form of a tablet computer. As shown in FIG. 3, display 14 may be mounted on the upper (front) surface of housing 12. An opening may be formed in display 14 to accommodate button 22.

Figure 4:
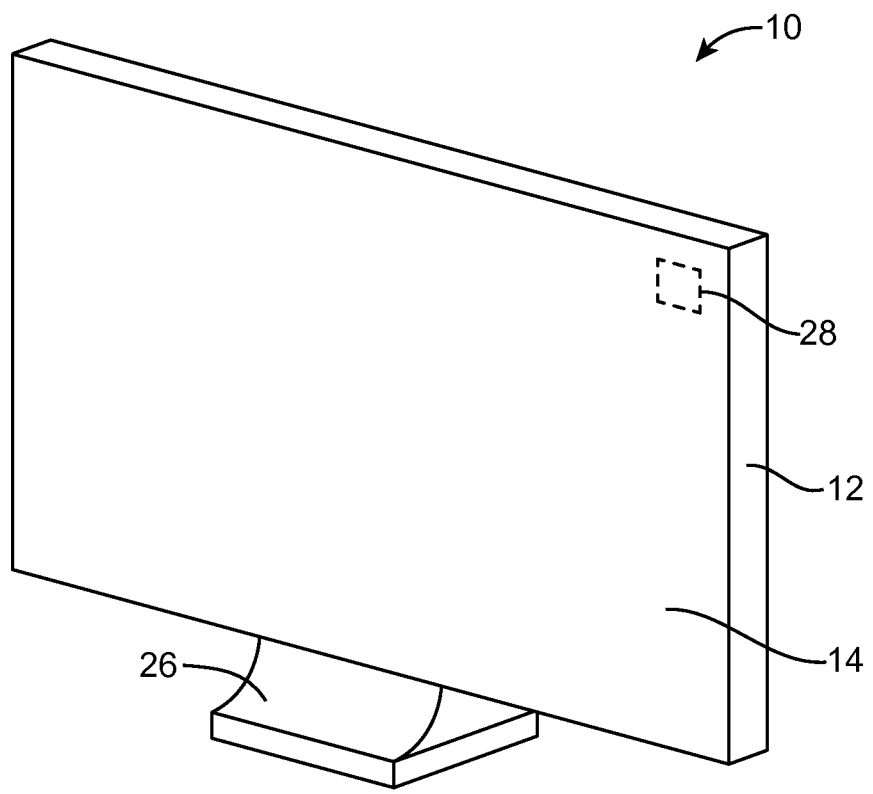
FIG. 4 is a diagram of an illustrative electronic device with a display such as a computer monitor with a built-in computer in accordance with an embodiment of the present invention.

FIG. 4 is a perspective view of electronic device 10 in a configuration in which electronic device 10 has been implemented in the form of a computer integrated into a computer monitor. As shown in FIG. 4, display 14 may be mounted on the front surface of housing 12. Stand 26 may be used to support housing 12.

Display 14 may include an array of display pixels. Each display pixel may be used to control the light intensity associated with a portion of the display.

Figure 5:
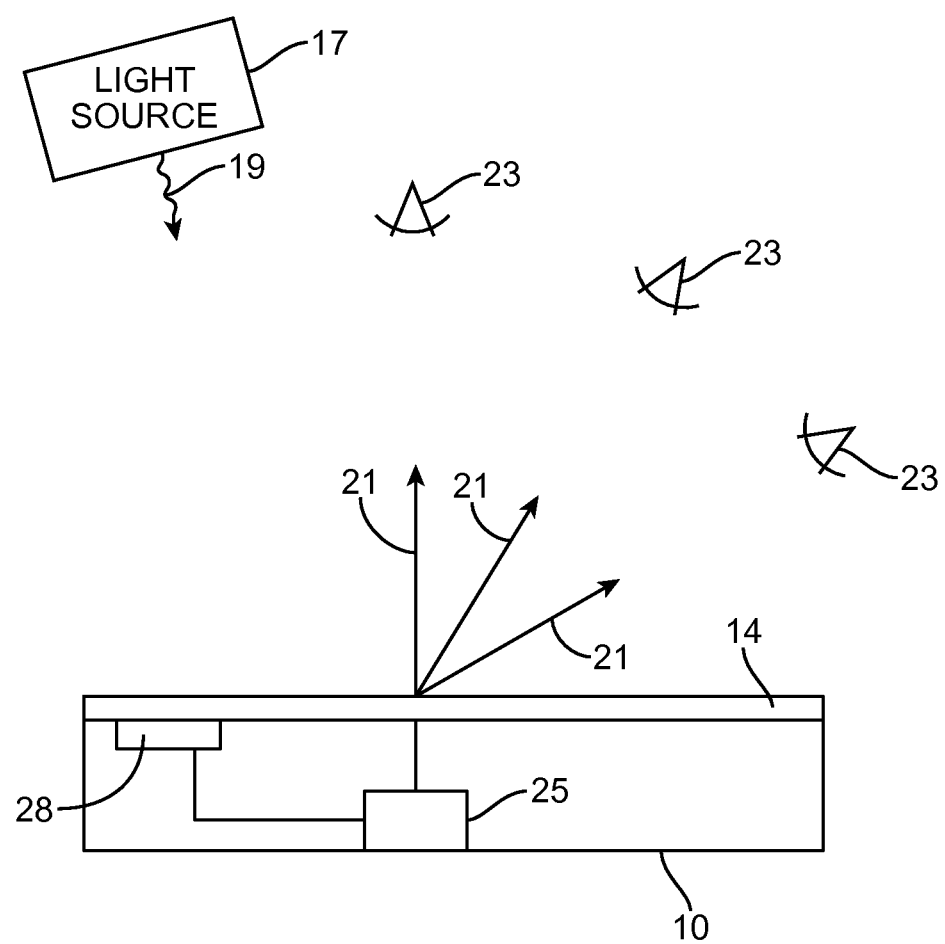
FIG. 5 is a cross-sectional side view of an illustrative electronic device showing how light may be emitted at several angles from the display in accordance with an embodiment of the present invention.

As shown in FIG. 5, display 14 may emit light at a variety of emission angles with respect to the surface of display 14. Depending on the position of a device with respect to a user 23, light such as light 21 from display 14 may be viewed at a variety of viewing angles. Light 21 may be generated by light emitting components of display 14. During normal operation of device 10, a light source such as light source 17 (e.g., the Sun, an incandescent light, or a fluorescent light) may generate ambient light 19. The visibility of content displayed by device 10 on display 14 may depend on the type of light emitted by light source 19, the position of light source 19 with respect to device 10, and the angle at which display 14 is viewed by a user. Display performance may be optimized using knowledge of the ambient light conditions. For this reason an ambient light detector such as directional light sensor 28 may be provided.

During normal operation of device 10, DLS 28 may collect directional light data. Circuitry 25 associated with device 10 may be configured to alter the intensity of one or more portions of the display based on the collected directional light data. Directional light sensor 28 may be configured to sense the position of an ambient light source such as light source 17 and the position of a user such as users 23 with respect to display 14. Circuitry 25 may be configured to increase or decrease the intensity of light 21 based on directional light data containing information about the position of light source 17, the content (e.g., color distribution) of light 19 and the position of users 23.

Circuitry 25 may include storage such as hard disk drive storage, nonvolatile memory (e.g., flash memory or other electrically-programmable-read-only memory configured to form a solid state drive), volatile memory (e.g., static or dynamic random-access-memory), etc. Circuitry 25 and other control circuitry in device 10 may be used to control the operation of device 10. This processing circuitry may be based on one or more microprocessors, microcontrollers, digital signal processors, baseband processors, power management units, audio codec chips, application specific integrated circuits, etc.

Circuitry 25 may be used to run software on device 10, such as internet browsing applications, voice-over-internet-protocol (VOIP) telephone call applications, email applications, media playback applications, operating system functions, game functions, navigation functions, functions related to capturing digital images and performing image stabilization operations, etc.

Figure 6:
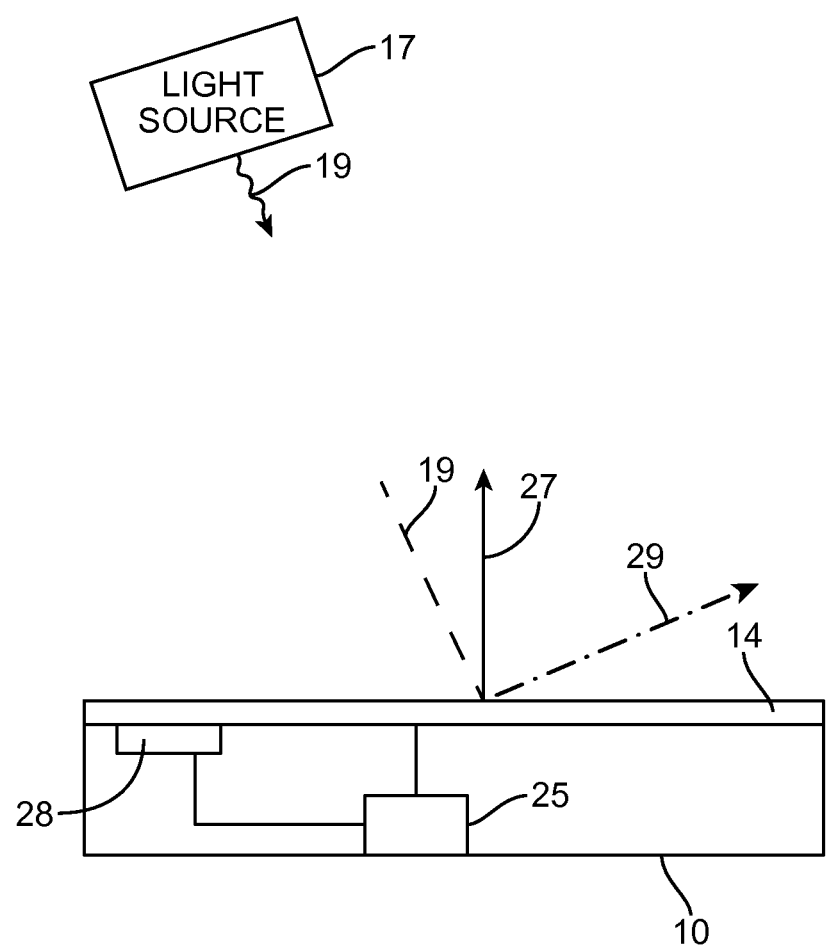
FIG. 6 is a cross-sectional side view of an illustrative electronic device showing how light may be reflected from the display in accordance with an embodiment of the present invention.

As shown in FIG. 6, a portion of light 19 that is incident on display 14 may be reflected to generate a portion of the display content of display 14 such as reflected display light 27. Display 14 may be provided with coatings such as anti-reflective (AR) coatings. However, some portion of light 19 may be reflected by an outer surface of display 14 (as indicated by dot-dashed arrow 29).

Directional light data collected by DLS 28 may be used by circuitry 25 to determine optimal settings for the display content of display 14 (e.g., the intensity, color or other content of light 27) to compensate for reflected portions 29 of light 19.

Figure 7:
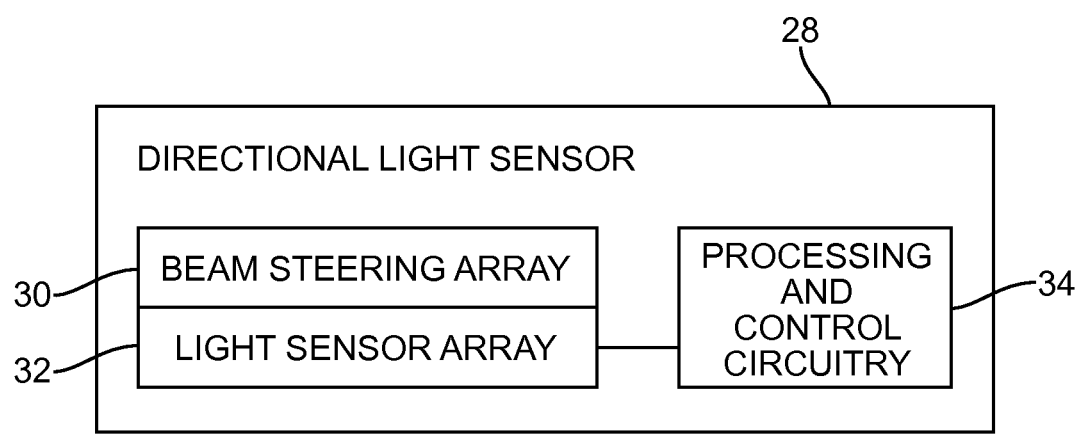
FIG. 7 is a diagram of an illustrative directional light sensor having a beam steering array and a light sensor array in accordance with an embodiment of the present invention.

As shown in FIG. 7, directional light sensor 28 may include an array of light sensors such as light sensor array 32 and an array of associated beam steering elements such as beam steering array 30.

If desired, DLS 28 may include processing and control circuitry 34. Circuitry 34 may be configured to operate light sensors in light sensor array 32 (e.g., by operating components of the light sensors to capture light), to read out and store directional light data from light sensor array 32, to process directional light data, etc.

Circuitry 34 may include storage such as nonvolatile memory (e.g., flash memory or other electrically-programmable-read-only memory configured to form a solid state drive), volatile memory (e.g., static or dynamic random-access-memory), one or more microprocessors, microcontrollers, digital signal processors, etc.

If desired, processing and control circuitry 34 may form a portion of light sensor array 32 or may be formed separately from light sensor array 32. Circuitry 34 may be formed as a portion of circuitry 25 (FIG. 5) or may be separate from other circuitry in device 10.

Figure 8:
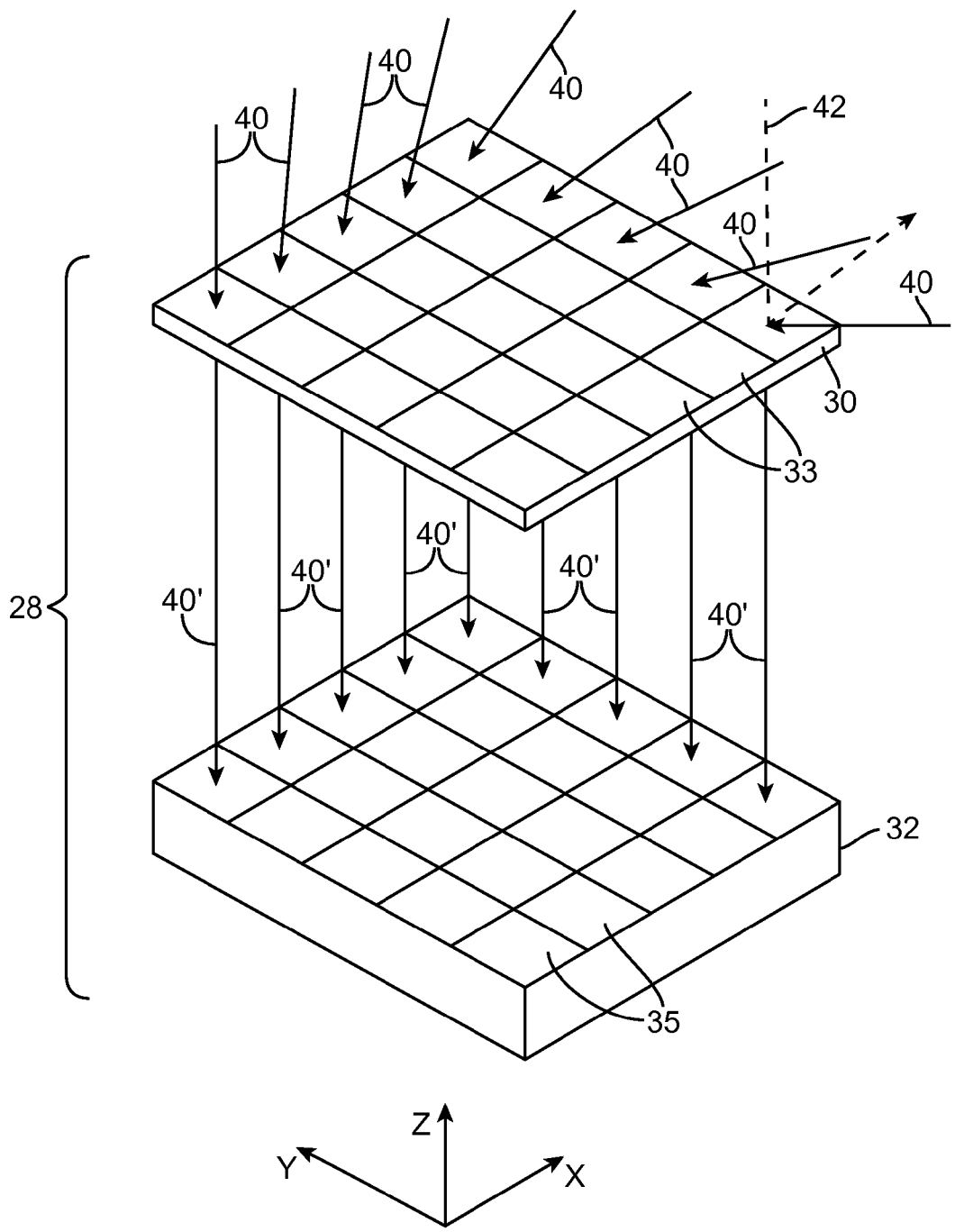
FIG. 8 is a diagram showing how an angular distribution of light may be mapped to a planar grid of light sensor pixels in accordance with an embodiment of the present invention.

Beam steering elements of beam steering array 30 may be configured to redirect light from a given preferred angle onto a given light sensor in light sensor array 32. As shown in FIG. 8, light such as light 40 may be incident on beam steering elements 33 of beam steering array 30 from many different angles. Each beam steering element 33 may be configured to redirect light 40 from a given preferred angle into a direction perpendicular to light sensor array 32. In this way, light 40' that has been redirected by beam steering elements 33 from a particular angle may be directed onto a corresponding light sensor 35.

Light such as light 42 that is incident on a beam steering element 33 from an angle other than the preferred angle of that element 33 may be reflected, absorbed, or otherwise prevented from reaching any of light sensors 35 of light sensor array 32. In this way, light from a given angle may be preferentially captured by a single one of light sensors 35 so that the intensity (and color) differences sensed by light sensors in the x-y plane of light sensor array 32 may be mapped to changes in the angular intensity (and color) distribution of light 40. Directional light data that is captured by directional light sensor 28 may be provided to circuitry 34.

Each beam steering element 33 in beam steering array 30 may be formed using holographic structures, refractive structures, diffusive structures, combined diffusive and lens structures, polarizing structures, or other structures for redirecting a beam of light.

Beam steering elements 33 may be formed on a common structure 30 (e.g., a common substrate formed from glass, plastic, silicon, composite or other transmissive material), or beam steering elements 33 may be individual beam steering structures that, in combination, form a beam steering array.

Holographic structures may include a thin transmissive film having an imprinted pattern of surface structures (e.g., an interference pattern) configured to reproduce an angular distribution of light that was present when the surface structures were imprinted. Imprinted structures may be formed using a photo emulsion (e.g., silver halide) on a substrate or may be formed on the substrate using any other suitable method for forming beam turning (steering) elements.

Light sensor array 32 may be an array of light-sensitive elements 35 such as photodiodes (e.g., a digital charge-coupled device (CCD) array, a complementary metal-oxide-semiconductor (CMOS) array, etc.) formed on a semiconductor substrate (e.g., silicon) or may be an array of individual light sensor structures that, in combination, form an array of light sensors that correspond to beam steering elements 33 of beam steering array 30.

Directional light data captured by directional light sensor 28 may include intensity (brightness) data, color data, and angular data. Each light sensor 35 may be configured to detect one or more colors of light. For example, each light sensor 35 may include multiple photodiodes, each having a color filter configured to pass a given color (or range of colors) of light. However, this is merely illustrative. If desired, light sensors 35 may be single color photosensors or may include spectrographic structures for detecting a spectrum of colors of light.

Figure 9:
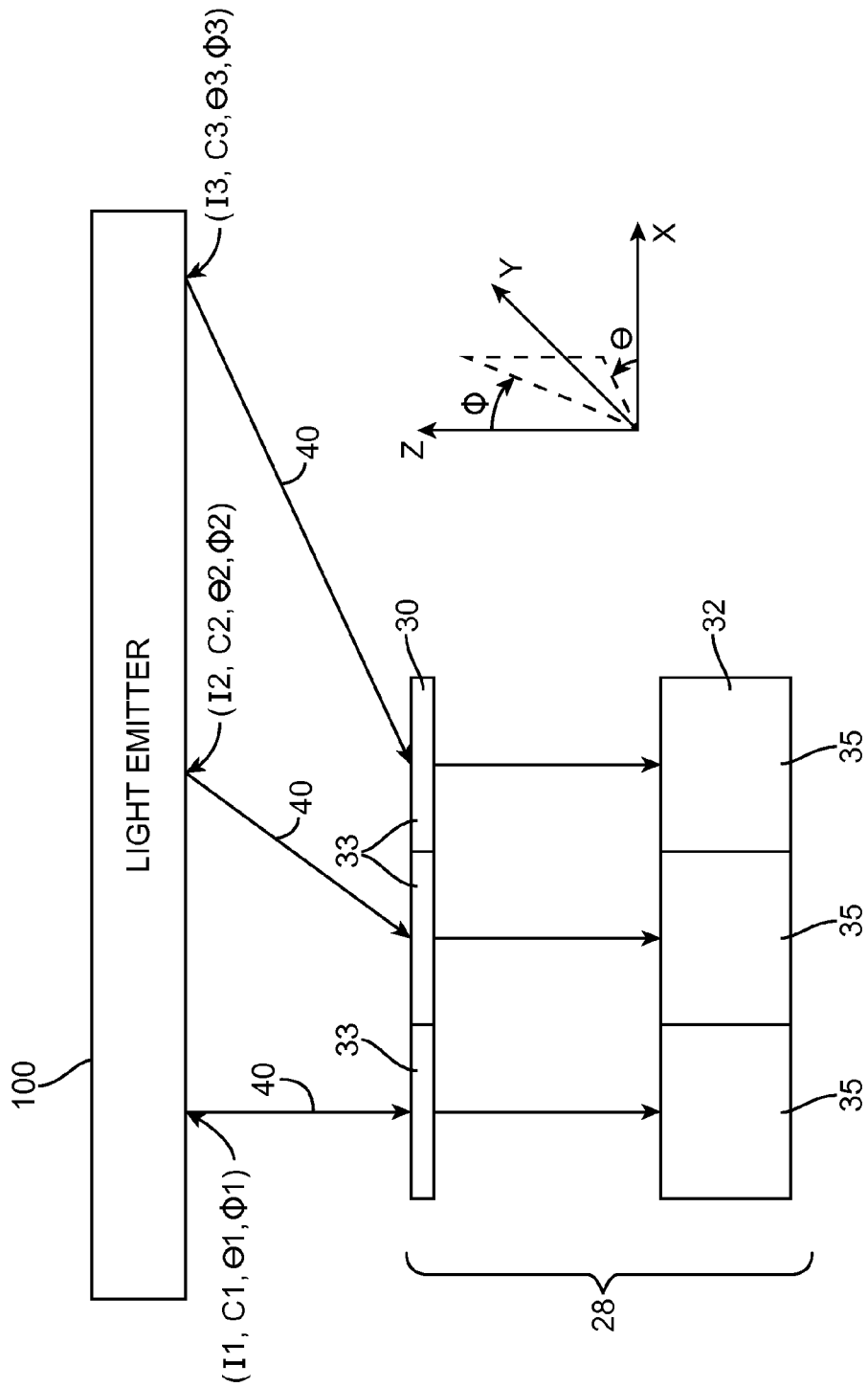
FIG. 9 is a cross-sectional side view of a portion of a directional light sensor showing how light emitted from different portions of a light emitter may be mapped to different light sensor pixels in accordance with an embodiment of the present invention.

As shown in FIG. 9, DLS 28 may be configured to capture directional light data from a light source such as light emitter 100. Light emitter 100 may be any light source (e.g., the Sun, the Moon, one or more fluorescent light bulbs, one or more incandescent light bulbs, one or more candles, a device such as device 10, a combination of light sources, light reflecting surfaces such as the edges of object, the walls of a room or other enclosure, etc.).

Light 40 may be emitted from one or portions of light emitter 100. In the example of FIG. 9, directional light sensor 28 includes three beam steering elements 33 configured to direct light from three angles (e.g., [θ1,Φ1], [θ2,Φ2], and [θ3,Φ3]) onto three corresponding light sensors 35. However, this is merely illustrative. If desired, beam steering array 30 may include less than three beam steering elements, or more than three beam steering elements (e.g., tens, hundreds, thousands, hundreds of thousands, or more beam steering elements). If desired, light sensor array 32 may include less than three light sensing elements, or more than three light sensing elements (e.g., tens, hundreds, thousands, hundreds of thousands, or more light sensing elements).

The corresponding light sensors 35 may be configured to collect intensity data I and color data C (e.g., [I1,C1], [I2,C2], and [I3,C3] respectively) in response to light 40 that is emitted from each of three corresponding positions on light emitter 100 (viewed from three corresponding viewing angles ([θ1,Φ1], [θ2,Φ2], and [θ3,Φ3] respectively). Each light sensor 35 may therefore collect directional light data (I, C, θ, Φ) corresponding to a given position on light emitter 100. Color data C may include multiple data points (e.g., relative intensities of two, three or more colors of light such as red light, green light and blue light).

In configurations in which light emitter 100 is an electronic device such as device 10, directional light data (I, C, θ, Φ) may be directional light data from one or more pixels of a display such as display 14 (see, e.g., FIG. 1). In this way, directional light data from directional light sensor 28 may be used to measure and or optimize the performance (e.g., the display uniformity, the color balance, the viewing quality at various viewing angles, etc.) of display 14.

In some situations, light emitter 100 may be a light source in a test system for testing device 10. In configurations in which light emitter 100 is a light source in a test system, directional light data from directional light sensor 28 may be processed and stored (e.g., using circuitry 34 or other circuitry or computing equipment) for later tests of the performance display 14 under light emitter 100 (e.g., test of the display reflectivity, efficiency and color dependence of a reflective display, etc.).

Figure 10:
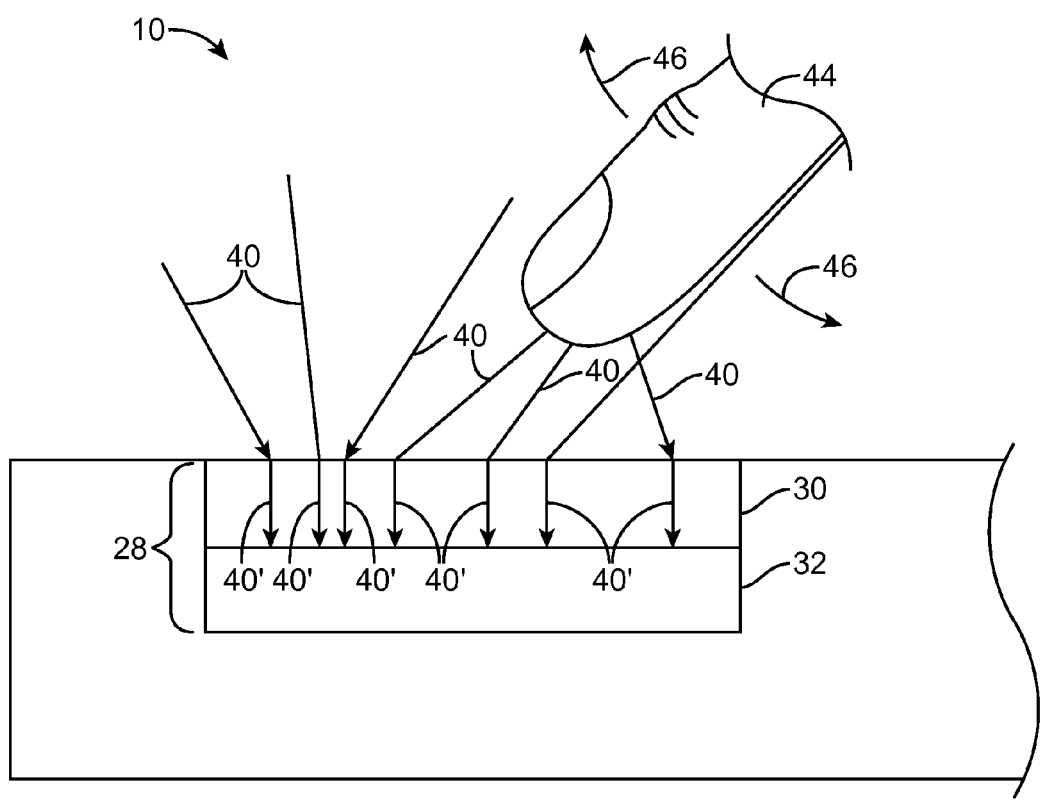
FIG. 10 is a diagram showing how a directional light sensor may be configured to sense touch-free user input in accordance with an embodiment of the present invention.

A directional light sensor 28 in device 10 may be configured to gather user input as shown in FIG. 10. During operation of device 10, a user may execute touch-free gestures in the vicinity of device 10 such as waving an object such as finger 44 in front of DLS 28 (as indicated by arrows 46). During execution of touch-free gestures such as waving, swiping, circular or other touch-free motions, light 40 from some angles may be temporarily blocked from reaching light sensor array 32. DLS 28 may be configured to detect changes in the ambient light distribution of light 40. DLS 28 may be configured to provide directional light data containing information about user gestures to processing circuitry 34 (FIG. 7) or other circuitry such as circuitry 25 (FIGS. 5 and 6).

Circuitry such as circuitry 34 may be configured to change the display content shown on display 14 in response to the touch-free user gestures detected by DLS 28 (e.g., by turning the page of a virtual book displayed on display 14, scrolling through a list of songs, names, movies, etc. displayed on display 14) or to generate other responses to the touch-free gestures (e.g., placing a call using cellular telephone or other wireless communications capabilities of device 10, waking device 10 from a standby or sleep mode, etc.).

Figure 11:
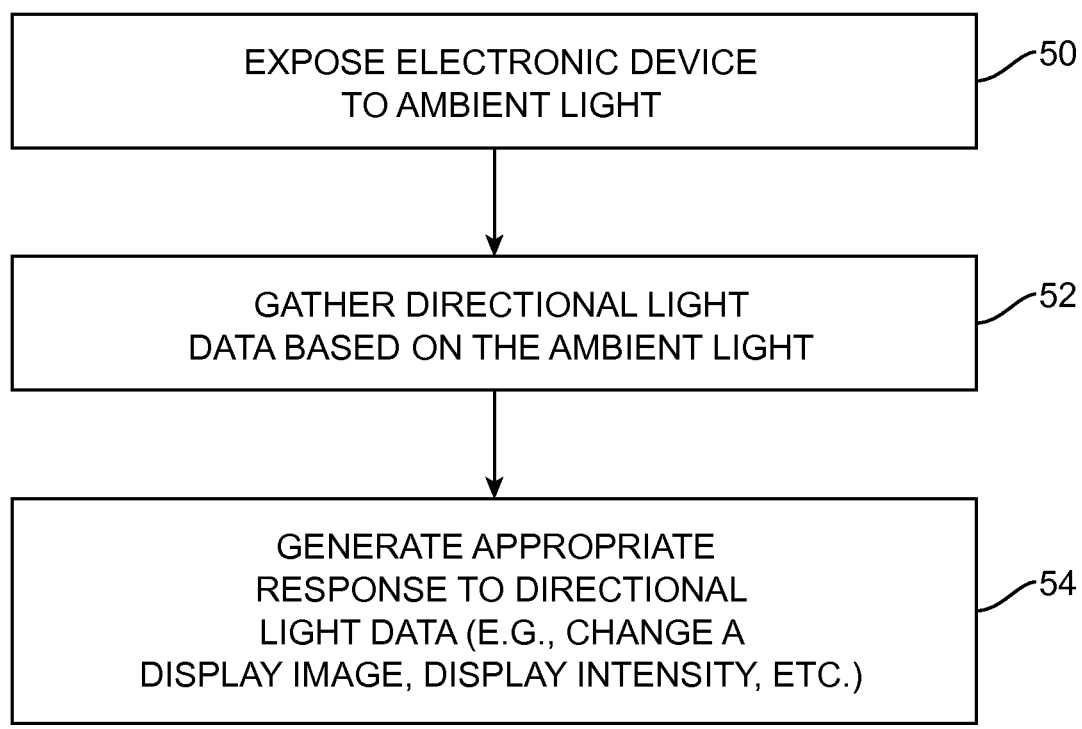
FIG. 11 is a flow chart of illustrative steps involved in generating a response to an angular distribution of ambient light in accordance with an embodiment of the present invention.

FIG. 11 is a flow chart of illustrative steps that may be used in gathering ambient light input using a directional light sensor in an electronic device.

At step 50, an electronic device such as device 10 may be exposed to ambient light. Exposing device 10 to ambient light may include operating device 10 under normal lighting conditions such as daylight, interior electric light or other light. Exposing device 10 to ambient light may include exposing device 10 to changing ambient light conditions.

At step 52, a directional light sensor such as DLS 28 of device 10 may be used to gather directional light data. Directional light data may include color, intensity and angular information about light in the vicinity of device 10. Directional light data may include temporal data including information about changes in an ambient light distribution due to user gestures, changing light conditions, etc. Directional light data may be provided to processing circuitry associated with DLS 28 or other processing circuitry in device 10.

At step 54, circuitry in device 10 may be configured to generate an appropriate response to the directional light data obtained by DLS 28. An appropriate response may include adjusting the color or intensity of one or more portions of a display such as display 14 to compensate for the presence of a particularly colored light source (e.g., to optimize display 14 for viewing under daylight lighting conditions or interior lighting conditions). An appropriate response may include altering the display content displayed on display 14 or may include changing the operating mode of device 10 (e.g., from running one application to running another application, from a standby mode to an operational mode, etc.).

The examples of FIGS. 1-6, 10 and 11 in which directional light sensor 28 is implemented in an electronic device such as electronic device 10 having a display is merely illustrative. If desired, directional light sensor 28 may be implemented in other environments such as a test system for testing electronic devices during manufacturing.

Figure 12:
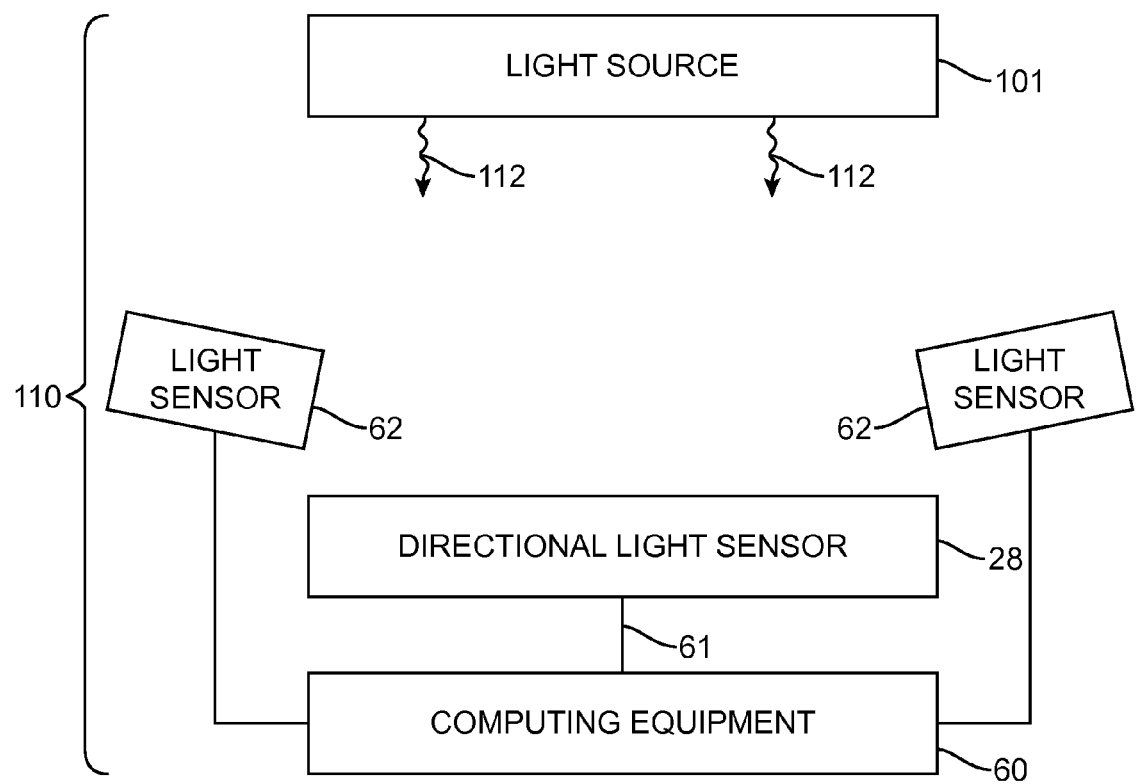
FIG. 12 is a diagram of an illustrative test system for measuring an angular distribution of light in accordance with an embodiment of the present invention.

As shown in FIG. 12, a directional light sensor such as DLS 28 may form a portion of a test system such as test system 110. Test system 110 may include one or more light emitters such as light source 101, one or more additional light sensors such as light sensors 62 and computing equipment such as computing equipment 60. Test system 110 may be configured to capture ambient light data and to use that ambient light data during subsequent testing of an electronic device such as device 10.

Computing equipment 60 may include test accessories, computers, network equipment, tester control boxes, cabling, and other test equipment for gathering and processing directional light data from DLS 28. During testing operations, DLS 28 may be configured to convey directional light data to computing equipment 60 over path 61. Path 61 may be a wired or wireless communications path.

Light sources such a light source 101 may include natural light sources such as the Sun or the Moon, one or more fluorescent light bulbs, one or more incandescent light bulbs, one or more candles, a combination of light sources, reflected light from one or more surfaces or objects, etc. Light source 101 may generate, during testing operations, a variety of lighting conditions such as daylight lighting conditions, florescent lighting conditions, incandescent lighting conditions, light-emitting-diode (LED) lighting conditions, etc. During testing operations, computing equipment 60 may use DLS 28 to gather and store directional light data containing information about the distribution of ambient light 112 in test system 110. Directional light data may be gathered for each type of lighting conditions generated by light source 101.

Additional light sensors 62 may be additional directional light sensors or may be conventional light sensors such as CCD cameras. Additional light sensors 62 may collect test data during test operations. Test data collected by additional light sensors 62 may be conveyed to computing equipment 60 for processing and storage.

During test operations, directional light sensor (DLS) 28 may be placed in to test system 110 and connected to computing equipment 60. If desired, light source 101 may be operated to emit ambient light 112 and directional light sensor 28 may gather directional light data (e.g., intensity, color, and angular data) associated with ambient light 112. Directional light data associated with ambient light 112 may be processed and stored on computing equipment 60.

Later, DLS 28 may, if desired, be removed from test system 110 and replaced with a device under test (DUT) such as DUT 10 of FIG. 13.

Figure 13:
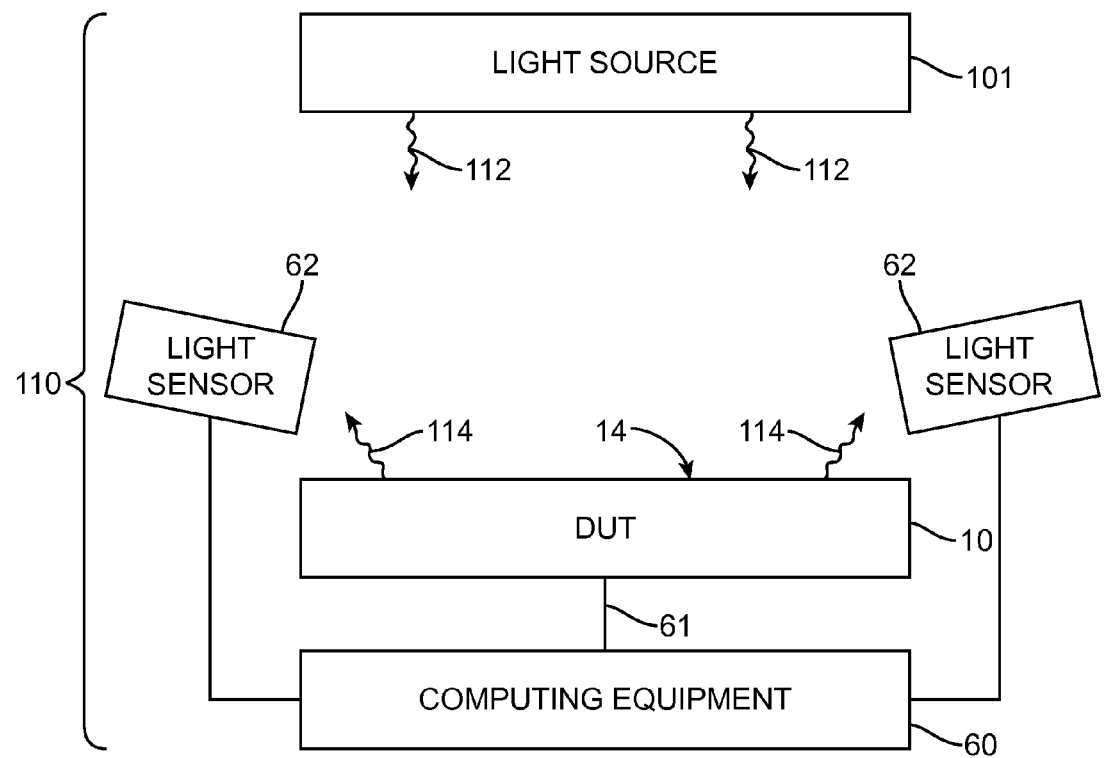
FIG. 13 is a diagram showing how a device under test may be placed in a test system of the type shown in FIG. 12 for testing in accordance with an embodiment of the present invention.

DUT 10 of FIG. 13 may be an electronic device having a display such as display 14 of FIGS. 1, 2, 3, and 4. During testing operations, after gathering and storing directional light data associated with ambient light 112, device 10 may be placed into test system 110. DUT 10 may be placed into test system 110 in the same configuration that DLS 28 was placed during gathering of directional light data.

Light source 101 may be operated in the same way that light source 101 was operated during gathering of directional light data using DLS 28. In this way, DUT 10 may be exposed to the same lighting conditions (e.g., light 112) as DLS 28 so that the directional light data stored on computing equipment 60 may be used during processing of test data (e.g., display test data) associated with DUT 10.

As shown in FIG. 13, during test operations, while light 112 is emitted by light source 101, light such as light 114 may be emitted by display 14 of DUT 10. Light 114 may be generated within device 10 (e.g., by an LCD backlight or OLED elements), may be reflected by reflective elements of display 14, may be reflected by an outer surface of display 14, or may be a combination of generated and reflected light from display 14 and/or the front (outer) surface of display 14.

Light 114 may be collected by additional light sensors 62. Light sensors 62 may generate display test data in response to light 114 that may be conveyed to computing equipment 60. Computing equipment 20 may be configured to process the test data in combination with the ambient light data (directional light data) gathered using DLS 28. Test data and ambient light data may be used to measure the performance of various components of display 14 under various lighting conditions. The test data may, for example, be compared to standard values that have been determined based on the ambient light data.

For example, computing equipment 60 may use test data and ambient light data to measure the amount of light 112 that is reflected by an outer surface of display 14 in order to measure the performance of an anti-reflective (AR) coating on the outer surface of display 14. Test system 110 may be used to perform test operations on multiple DUTs 10 having different AR coatings in order to determine the best AR coating for use with display 14.

As another example, in configurations in which display 14 is a reflective display (e.g., a display that uses absorbed and reflected portions of ambient light such as light 14 to generate display content), test data and ambient light data may be used to determine the visibility of display content under various lighting conditions.

In another possible configuration, display 14 may be an emissive display such as an LCD or OLED display. In configurations in which display 14 is an emissive display, test data and ambient light data may be used to optimize display performance (e.g., display intensity and color) under a variety of lighting conditions.

During test operations, test system 110 (e.g. computing equipment 60) may be configured to generate a test result based on the comparison of the test data with the standard values. Suitable actions may be taken based on the test results. For example, if a test result indicates a poorly performing display (e.g., test data that is outside of a given range of the standard values), that display may be removed from the device, or the device may be returned to a previous manufacturing station for reconfiguration. If the test result indicates a correctly performing display, the device may be shipped to a customer or may be passed on to a subsequent manufacturing station.

Figure 14:
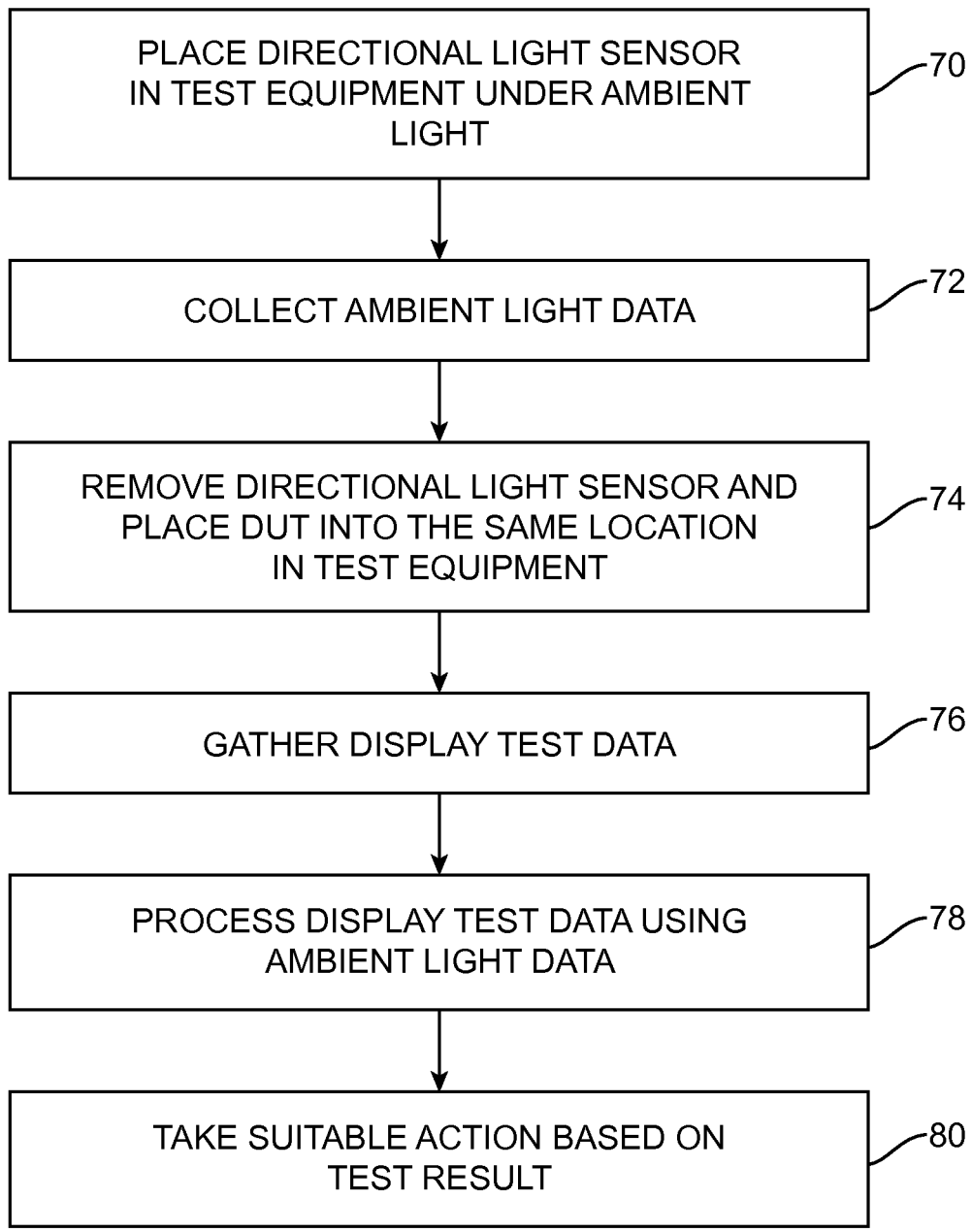
FIG. 14 is a flow chart of illustrative steps involved in testing display performance by measuring ambient light conditions using a directional light sensor in accordance with an embodiment of the present invention.

FIG. 14 is a flow chart of illustrative steps that may be used in performing tests of a device under test in a test system having a directional light sensor.

At step 70, a directional light sensor such as DLS 28 may be placed into a test system having computing equipment, one or more light sources, and one or more additional light sensors. Ambient light may be generated by the light source(s) and allowed to fall on the directional light sensor.

At step 72, the directional light sensor may be used to collect ambient light data corresponding to the light generated by the light source(s). Ambient light data (directional light data) may be stored using computing equipment of the test system. If desired, standard data may be generated based on the ambient light data for later comparison with test data associated with the device under test.

At step 74, if desired, the directional light sensor may be removed from the test system and replaced with the device under test. The device under test may be placed into the same location from which the directional light sensor was removed.

At step 76, display test data (test data) may be gathered using the additional light sensors. Display test data may be test data generated in response to light that has been emitted or reflected from a device display such as display 14 while the display is exposed to the light from the light source(s) of the test system.

At step 78, the computing equipment of the test system may be used to process the display test data using the ambient light data that was gathered by the directional light sensor at step 72. Processing the display test data using the ambient light data may include generating test results by comparing the display test data to standard values that were determined based on the ambient light data.

At step 80, suitable action may be taken based on the results of the comparison of the display test data with the standard values that were determined based on the ambient light data.

Suitable action may include, if the display test data is outside of an acceptable range of values, replacing the display, reworking the display, or eliminating a tested component, a tested operating mode, or a tested coating from consideration for use with displays for devices such as device 10. Suitable action may include, if the display test data is within an acceptable range of values, choosing a tested component, a tested operating mode, or a tested coating for future use in displays for devices such as device 10, shipping a tested device to a consumer, or passing a tested device onto a subsequent manufacturing station.

The examples of FIGS. 13 and 14 in which directional light sensor 28 is removed from test system 110 are merely illustrative. If desired, DUT 10 may be placed over DLS 28 or DLS 28 may be used to gather display test data from display 14 itself. In one suitable configuration, light source 101 of FIG. 12 may include display 14 of DUT 10. In configurations in which display 14 of DUT 10 is visible to DLS 28 (e.g., light 112 is generated by display 14), DLS 28 may gather display test data containing information corresponding to the uniformity, the color performance, the reflectivity, or other characteristics of display 14.

Figure 15:
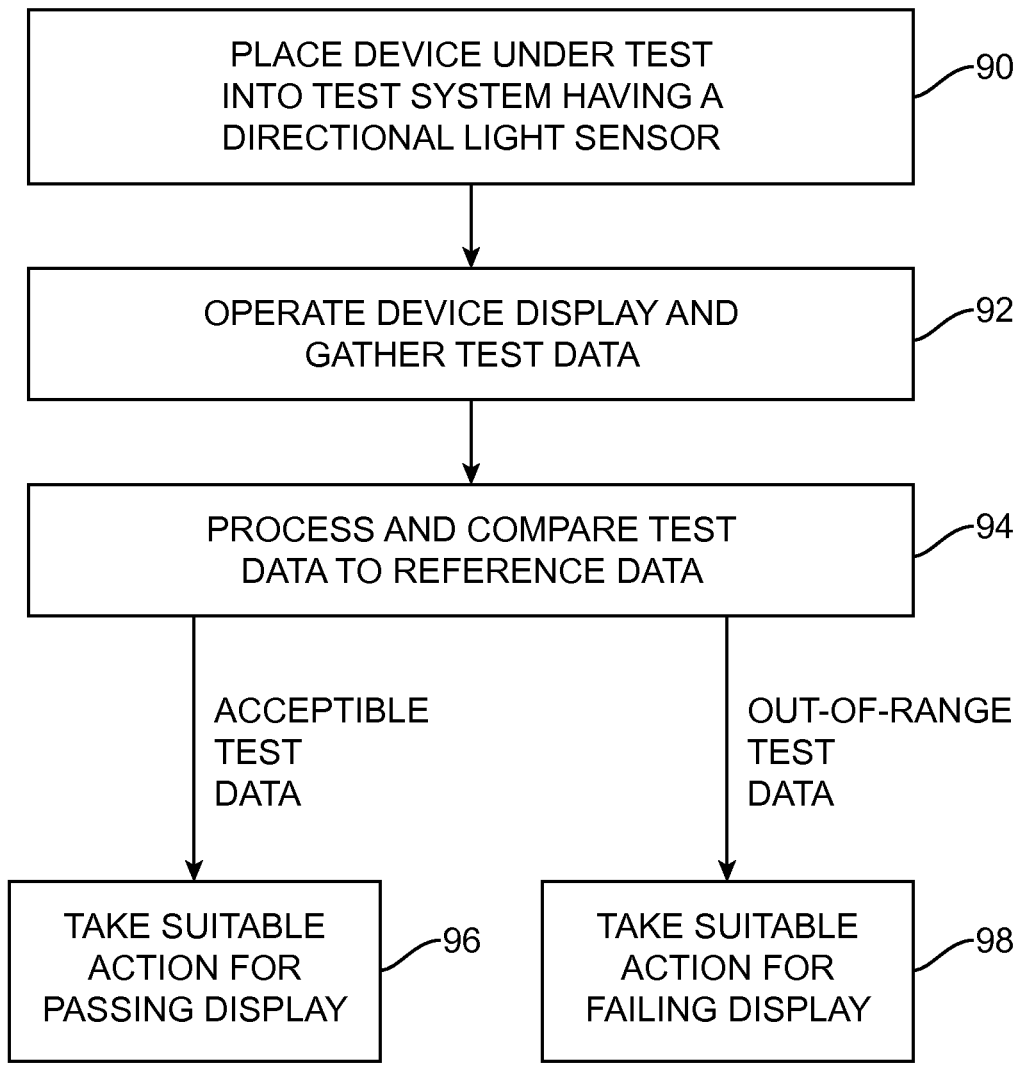
FIG. 15 is a flow chart of illustrative steps involved in testing a device display using a directional light sensor in accordance with an embodiment of the present invention.

FIG. 15 is a flow chart of illustrative steps that may be used in gathering display test data from a device under test in a test system using a directional light sensor.

At step 90, an electronic device under test (e.g., DUT 10) having a display (e.g., display 14) may be placed into a test system such as test system 110. DUT 10 may be placed into a location in test system 110 that allows light from display 14 to be detected by the directional light sensor (e.g., DLS 28).

At step 92, the device display may be operated. For example, a uniform color may be displayed by all pixels of a display such as display 14. During operation of the display, directional light data may be gathered by the directional light sensor in response to the light emitted by the display. If desired, multiple uniform colors at multiple intensities may be displayed and display test data may be gathered at each color and at each intensity.

If desired, during operation of the display, non-uniform, known content may also be displayed while display test data is gathered by the directional light sensor. Directional light data may include information on the uniformity, the color performance, the reflectivity, or other properties of the display at one or more viewing angles.

At step 94, the computing equipment of the test system may be used to process the display test data and compare the display test data to predetermined quality data.

If the test data is determined to be within an acceptable range of the predetermined quality data, the test system may proceed to step 96.

At step 96, suitable action may be taken for a passing display. Suitable action for a passing display may include, choosing a tested component, a tested operating mode, or a tested coating for future use in displays for devices such as device 10, shipping a tested device to a consumer, or passing a tested device onto a subsequent manufacturing station.

If the test data is determined to be outside the acceptable range of the predetermined quality data, the test system may proceed to step 98.

At step 98, suitable action may be taken for a failing display. Suitable action for a failing display may include, replacing the display, reworking the display, or eliminating a tested component, a tested operating mode, or a tested coating from consideration for use with displays for devices such as device 10.

Figure 16:
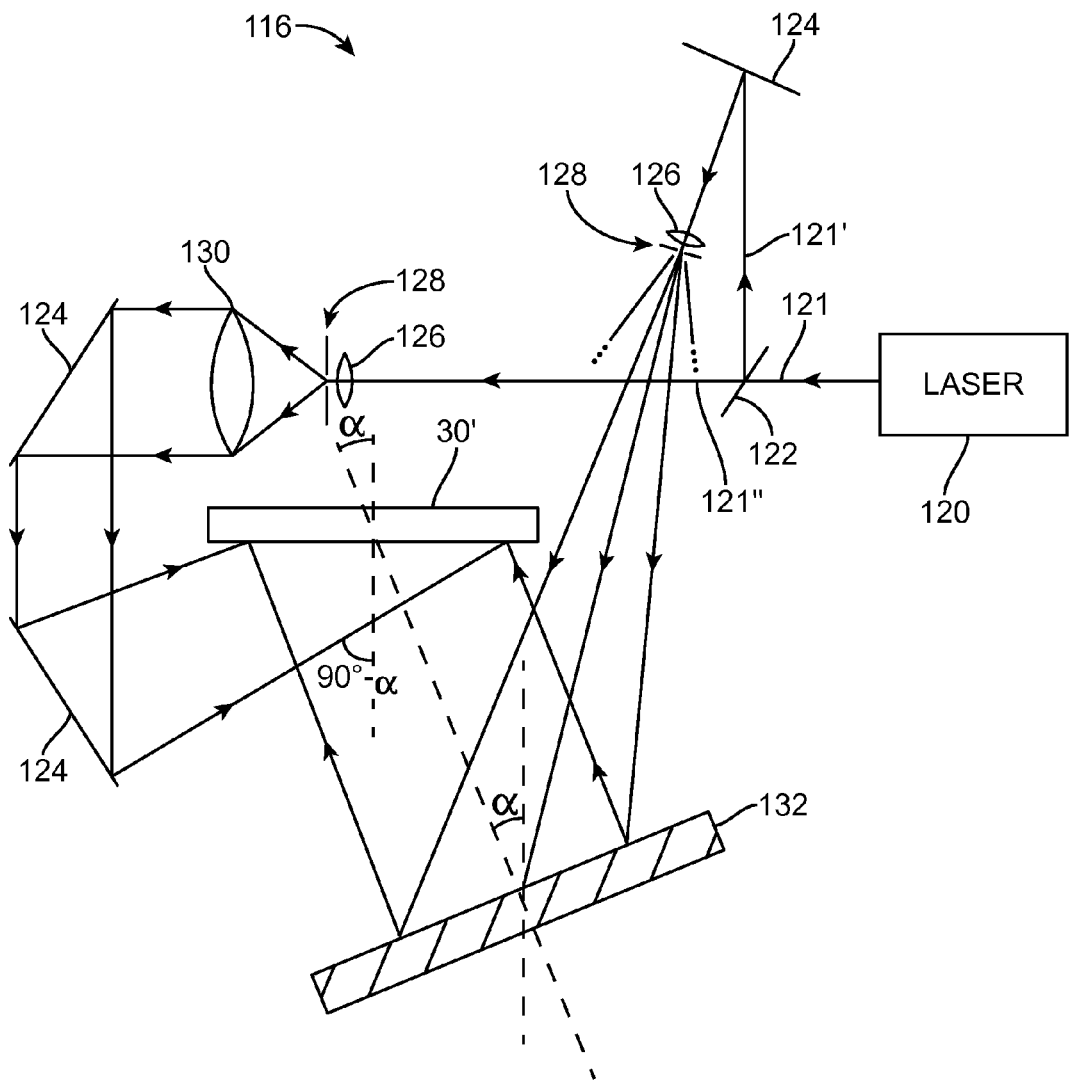
FIG. 16 is a diagram of an illustrative system for forming interference structures on a beam steering array in accordance with an embodiment of the present invention.

FIG. 16 is a diagram showing a system for forming interference structures for beam steering array 30. As shown in FIG. 16, system 116 may include a light source such as laser 120, a beam splitter 122, one or more mirrors 124, one or more diverging lenses 126, one or more apertures 128, one or more converging lenses 130 and a data input structure 132.

Light 121 that is generated by laser 120 may be directed to a beam splitter such as beam splitter 122. A portion 121" of light 121 may pass through beam splitter 122 and continue undeflected. Another portion 121' of light 121 may be redirected and reflected by one of mirrors 124. Redirected portion 121' of light 121 may be reflected from one of mirrors 124 and may be dispersed by a diverging lens 126.

After light 121' is dispersed by lens 126, light 121' may pass through an aperture 128 to limit the stray light in system 116. After passing through aperture 128, light 121' may be incident on a data input structure such as structure 132. Structure 132 may be a reflective structure and/or, if desired, structure 132 may include a preformed pattern of surface (or internal) features for inputting a desired pattern into light 121'. Light 121' that is reflected from structure 132 may be directed onto a substrate such as substrate 30'.

Substrate 30' may be a beam steering array that is undergoing manufacturing or may be a master holographic structure that is undergoing manufacturing to be used for forming multiple beam steering arrays. Substrate 30' may be a polymer film or other structure. Substrate 30' may include a surface coating of photo-sensitive material or may include photo-sensitive elements within substrate 30'.

During formation of beam steering array 30, data input structure 132 may be configured for generating a pattern of holographic beam steering pixels on substrate 30'.

For example, structure 132 may be positioned at an angle with respect to substrate 30'. As shown in FIG. 16, structure 132 may be rotated by an angle $\alpha$ with respect to substrate 30'. The angle $\alpha$ at which structure 132 is positioned with respect to substrate 30' may correspond to an angle at which light may later be redirected by beam steering array 30 during operation of directional light sensor 28. If desired, structure 132 may include portions positioned at an angle $\alpha$ and other portions positioned at other angles with respect to substrate 30' in order to generate multiple beam steering pixels on substrate 30' (e.g., to form beam steering array 30).

Light 121" that has passed undeflected through beam splitter 122 may be dispersed by a diverging lens 126 and may pass through an aperture 128. Light 121" that has passed through aperture 128 may be collimated using a converging lens such as lens 130. Collimated light 121" may be reflected from one or more mirrors 124 onto substrate 30'. As shown in FIG. 16, light 121" may be reflected onto substrate 30' at an angle that is complementary to angle $\alpha$ (e.g., an angle substantially equal to 90 degrees minus $\alpha$). Interference between light 121" and light 121' may interact with photo-sensitive elements of substrate 30' to generate holographic interference structures on substrate 30'.

If desired, after exposure to interfering light 121' and 121", substrate 30' may be subjected to additional processes such as developing and/or copying processes in order to form one or more beam steering arrays 30 from substrate 30'.

Figure 17:
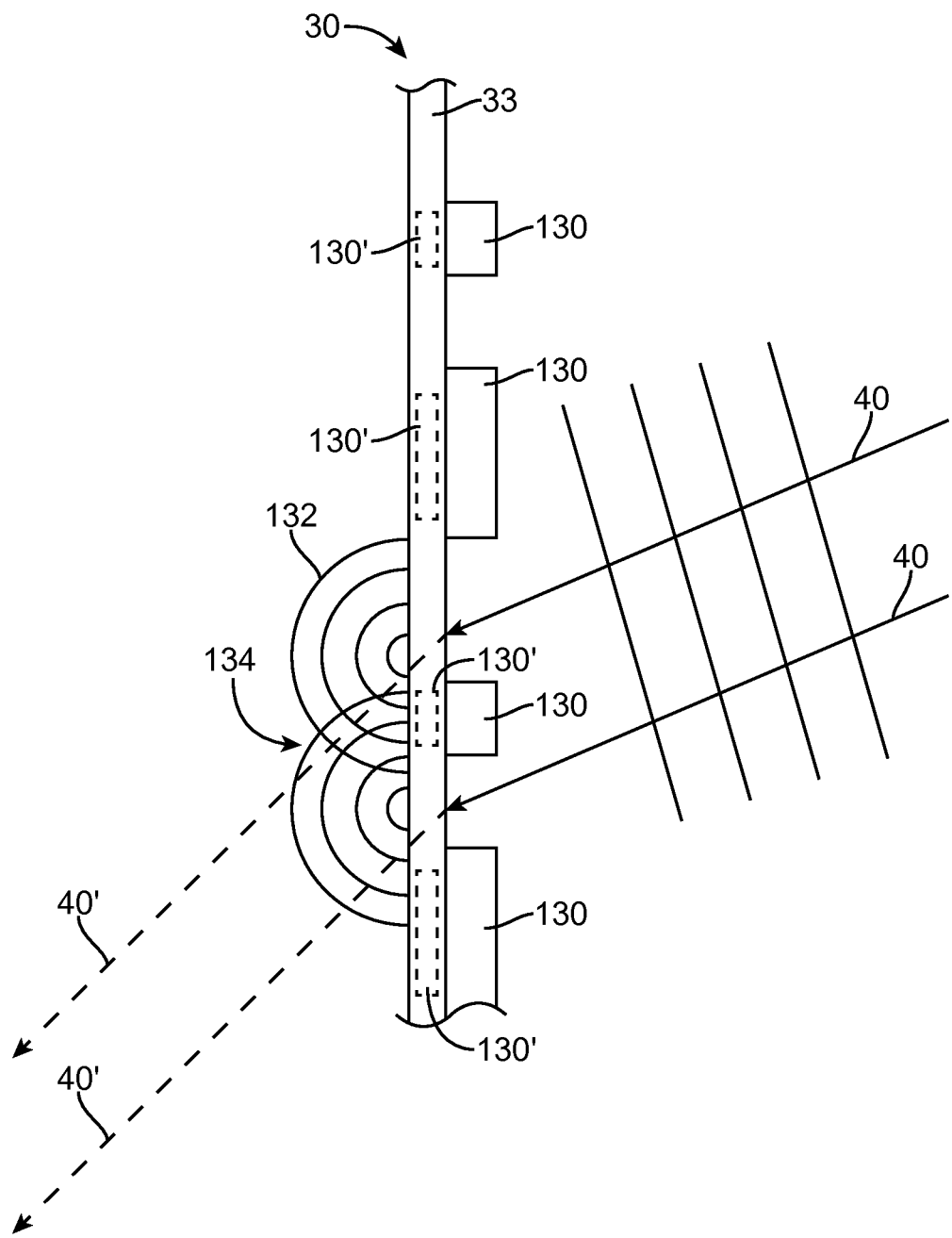
FIG. 17 is a diagram showing how interference structures may generate interference pattern that redirects a light beam in accordance with an embodiment of the present invention.

FIG. 17 is a cross-sectional side view of a portion of one of beam steering elements 33 of beam steering array 30. As shown in FIG. 17, beam steering element 33 may include interfering features such as surface features 130 configured to generate interfering light waves 132 in response to incoming light 40. However, this is merely illustrative. Interfering features may, if desired, be formed internally to beam steering elements 33 (as shown by dashed lines 130').

Interfering features 130 (and/or 130') may be formed, for example, using interfering light such as light 121' and light 121" of FIG. 16.

Interfering light waves 132 that were generated by interfering structures 130 (or 130') in response to light 40, may interfere with each other in an interference region 134. The interference of light waves 132 may cause light 40 to be redirected so that redirected light 40' emerges from beam steering element 33 in at a different angle with respect to light 40. Light 40' may be detected by one of light sensors 35 of light sensor array 32.

The foregoing is merely illustrative of the principles of this invention and various modifications can be made by those skilled in the art without departing from the scope and spirit of the invention. The foregoing embodiments may be implemented individually or in any combination.

What is claimed is:

1. A directional light sensor, comprising:
   an array of light sensitive elements, wherein a first portion of the array of light sensitive elements includes light sensitive elements that are sensitive to light of a first color and wherein a second portion of the array of light sensitive elements includes light sensitive elements that are sensitive to light of a second color that is different than the first color; and
   a corresponding array of beam steering elements arranged in rows and columns, wherein each beam steering element corresponds to an associated one of the light sensitive elements and redirects light from a particular incidence angle onto the associated one of the light sensitive elements.

2. The directional light sensor defined in claim 1, further comprising:
   processing circuitry coupled to the array of light sensitive elements that operates the light sensitive elements to gather directional light data.

3. The directional light sensor defined in claim 1 wherein each beam steering element comprises holographic structures that redirect the light.

4. The directional light sensor defined in claim 1 wherein each beam steering element comprises refractive structures that redirect the light.

5. The directional light sensor defined in claim 1 wherein each beam steering element comprises diffusive structures that redirect the light.

6. The directional light sensor defined in claim 5 wherein each beam steering element further comprises lensing structures that redirect the light.

7. An electronic device, comprising:
   a display having a transparent cover layer;
   a directional light sensor at least partially covered by the transparent cover layer, wherein the directional light sensor is configured to gather directional ambient light data that includes information about the intensity of light that is incident on the directional light sensor from a plurality of angles; and
   processing circuitry coupled to the display and the directional light sensor, wherein the processing circuitry is configured to modify an intensity of display light from at least a portion of the display based on the directional ambient light data, and wherein the processing circuitry includes filtering circuitry that filters the directional ambient light data to remove directional changes in light conditions that occur on time scales that are faster than a predetermined threshold from the directional ambient light data.

8. The electronic device defined in claim 7 wherein the directional light sensor is mounted adjacent to the transparent cover layer.

9. The electronic device defined in claim 7 wherein the processing circuitry is configured to determine a position of an external light source based on the directional ambient light data and to modify the intensity of display light from at least the portion of the display based on the determined position of the external light source.

10. The electronic device defined in claim 9 wherein the processing circuitry is configured to determine a position of a user of the electronic device based on the directional ambient light data and to modify the intensity of display light from at least the portion of the display based on the determined position of the external light source and the determined position of the user.

11. The electronic device defined in claim 7 wherein the directional light sensor comprises an array of beam steering elements and an array of light sensitive elements.

12. The electronic device defined in claim 7 wherein the display comprises a transflective display having transmissive structures and reflective structures and wherein the processing circuitry is configured to adjust an intensity of light produced by the transmissive structures based on the directional ambient light data.

13. The electronic device defined in claim 7 wherein the directional light sensor gathers the directional ambient light data at least partially based on a change in the intensity of the light that is incident on the directional light sensor from a given one of the plurality of angles.

14. An electronic device, comprising:
an electronic device housing;
a touch-free user input component configured to gather user input data based on directional changes in ambient light conditions due to user gestures in the vicinity of the electronic device, wherein the touch-free user input component is configured to gather the user input data based on directional changes in the ambient light conditions by detecting a change in an amount of ambient light that is received at the touch-free user input component from a given angle; and
processing circuitry coupled to the touch-free user input component, wherein the processing circuitry is configured to modify an operational state of the electronic device based on the gathered user input data, and wherein the touch-free user input component and processing circuitry are mounted within the electronic device housing.

15. The electronic device defined in claim 14 wherein the touch-free user input component comprises a beam steering array.

16. The electronic device defined in claim 15 wherein the touch-free user input component further comprises a light sensor array, wherein the beam steering array is configured to redirect portions of the ambient light from various angles of incidence onto corresponding portions of the light sensor array.

17. The electronic device defined in claim 16, wherein the processing circuitry is further configured to map intensity differences sensed using the light sensor array to changes in an angular intensity distribution of the ambient light.

18. The electronic device defined in claim 15 wherein the beam steering array comprises a plurality of beam steering elements formed from structures selected from the group consisting of: holographic structures, refractive structures, diffusive structures, and combined diffusing and lensing structures.

19. The electronic device defined in claim 18, wherein the plurality of beam steering elements are each formed on a common light transmissive substrate.

20. The electronic device defined in claim 14, further comprising a display for displaying visual content to the user, wherein the processing circuitry is configured to modify the operational state of the electronic device by modifying the visual content that is displayed on the display.

21. The electronic device defined in claim 14, further comprising a display, wherein the user gestures comprise user hand gestures.

22. The electronic device defined in claim 14 wherein the processing circuitry includes filtering circuitry that filters the gathered user input data to remove directional changes in light conditions that occur on time scales that are faster than a predetermined threshold from the gathered user input data.

23. The electronic device defined in claim 14, wherein the processing circuitry is configured to run a first application before gathering the user input data using the touch-free user input component and wherein the processing circuitry is configured to modify the operational state of the electronic device based on the user input data gathered by the touch-free user input component by running a second application that is different from the first application.

24. The electronic device defined in claim 14, wherein the electronic device is configured to operate in a standby mode before gathering the user input data with the touch-free user input component and wherein the electronic device is configured to modify the operational state of the electronic device based on the user input data gathered by the touch-free user input component by changing the electronic device to an operational mode from the standby mode.

25. The electronic device defined in claim 14, further comprising:
a display, wherein the processing circuitry is configured to modify an intensity of display light from at least a portion of the display based on the user input data gathered by the touch-free user input component.

* * * * *